US009506394B2

(12) United States Patent
Hutchins et al.

(10) Patent No.: US 9,506,394 B2
(45) Date of Patent: Nov. 29, 2016

(54) METHOD OF CONTROLLING TEMPERATURE

(71) Applicant: JAGUAR LAND ROVER LIMITED, Warwickshire (GB)

(72) Inventors: William Hutchins, Coventry (GB); Stuart Briscoe, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 83 days.

(21) Appl. No.: 14/404,329

(22) PCT Filed: May 31, 2013

(86) PCT No.: PCT/EP2013/061289
§ 371 (c)(1),
(2) Date: Nov. 26, 2014

(87) PCT Pub. No.: WO2013/178797
PCT Pub. Date: Dec. 5, 2013

(65) Prior Publication Data
US 2015/0176472 A1    Jun. 25, 2015

(30) Foreign Application Priority Data

May 31, 2012    (GB) .................................. 1209679.8

(51) Int. Cl.
*F02P 7/00*    (2006.01)
*F01P 7/16*    (2006.01)
(Continued)

(52) U.S. Cl.
CPC .. *F01P 7/16* (2013.01); *F01P 3/02* (2013.01); *F01P 7/164* (2013.01); *F01P 7/165* (2013.01);
(Continued)

(58) Field of Classification Search
CPC ............ F01P 7/16; F01P 7/164; F01P 7/165; F01P 2070/04; F01P 2060/04; F01P 2060/12; F01P 2060/08; F01P 2060/16; F01P 2025/32; F01P 2025/46
USPC ................................ 123/41.01, 41.02, 41.05
See application file for complete search history.

(56) References Cited

U.S. PATENT DOCUMENTS 4,370,950 A    2/1983  Furukubo
4,410,133 A    10/1983  Furukubo
(Continued)

FOREIGN PATENT DOCUMENTS

DE         20122547 U1    4/2006
DE     102008007766 A1    8/2009
(Continued)

OTHER PUBLICATIONS

Combined Search and Examination Report for Application No. GB1309738.1 dated Jan. 28, 2014.
(Continued)

*Primary Examiner* — Hai Huynh
(74) *Attorney, Agent, or Firm* — Carlson, Gaskey & Olds

(57) ABSTRACT

A method of controlling the temperature of an engine of a vehicle, such as an internal combustion engine and/or the temperature of one or more auxiliary components of the vehicle, such as a cabin heater for the vehicle includes monitoring one or more parameters of the engine including the temperature of the engine. Optionally data relating to the temperature of the engine is feedback to a control unit. The method includes monitoring one or more requirements of the one or more auxiliary components of the vehicle and/or monitoring one or more parameters of the one or more auxiliary components of the vehicle. In dependence upon said monitoring, the method includes selecting a cooling mode for a cooling system disposed about said engine and said one or more auxiliary components.

18 Claims, 4 Drawing Sheets

(51) Int. Cl.
*G05D 23/19* (2006.01)
*G05D 23/02* (2006.01)
*F01P 3/02* (2006.01)
*F01P 7/14* (2006.01)

(52) U.S. Cl.
CPC ........ *G05D 23/021* (2013.01); *G05D 23/1917* (2013.01); *F01P 2003/027* (2013.01); *F01P 2007/146* (2013.01); *F01P 2025/13* (2013.01); *F01P 2025/32* (2013.01); *F01P 2025/40* (2013.01); *F01P 2025/46* (2013.01); *F01P 2025/62* (2013.01); *F01P 2025/64* (2013.01); *F01P 2050/24* (2013.01); *F01P 2060/04* (2013.01); *F01P 2060/08* (2013.01); *F01P 2060/12* (2013.01); *F01P 2060/16* (2013.01); *F01P 2070/04* (2013.01); *Y10T 137/0324* (2015.04); *Y10T 137/87249* (2015.04)

(56) References Cited

U.S. PATENT DOCUMENTS

| | | |
|---|---|---|
| 4,748,941 A | 6/1988 | Kashiwase |
| 6,109,218 A | 8/2000 | Bachschmid et al. |
| 6,607,142 B1 | 8/2003 | Boggs et al. |
| 6,843,211 B2 * | 1/2005 | Iwasaki ............... B60H 1/02 123/41.31 |
| 6,899,162 B2 | 5/2005 | Hohl et al. |
| 8,600,615 B2 * | 12/2013 | Martini ................ F02D 41/021 180/65.1 |
| 2003/0217707 A1 | 11/2003 | Iwasaki |
| 2004/0050544 A1 | 3/2004 | Hohl et al. |
| 2008/0308049 A1 | 12/2008 | Komurian et al. |

FOREIGN PATENT DOCUMENTS

| | | |
|---|---|---|
| EP | 1308609 A1 | 5/2003 |
| EP | 2096276 A1 | 9/2009 |
| FR | 2849673 A1 | 7/2004 |
| FR | 2934319 A1 | 1/2010 |
| GB | 2164740 A | 3/1986 |
| WO | 2007128123 A1 | 11/2007 |
| WO | 2008029029 A1 | 3/2008 |
| WO | 2009113366 A1 | 9/2009 |

OTHER PUBLICATIONS

International Search Report for International application No. PCT/EP2013/061291 mailed Jul. 17, 2013.
International Search Report for International application No. PCT/EP2013/061289 mailed Aug. 28, 2013.
Combined Search and Examination Report for Application No. GB1309736.5 dated Jan. 16, 2014.

* cited by examiner

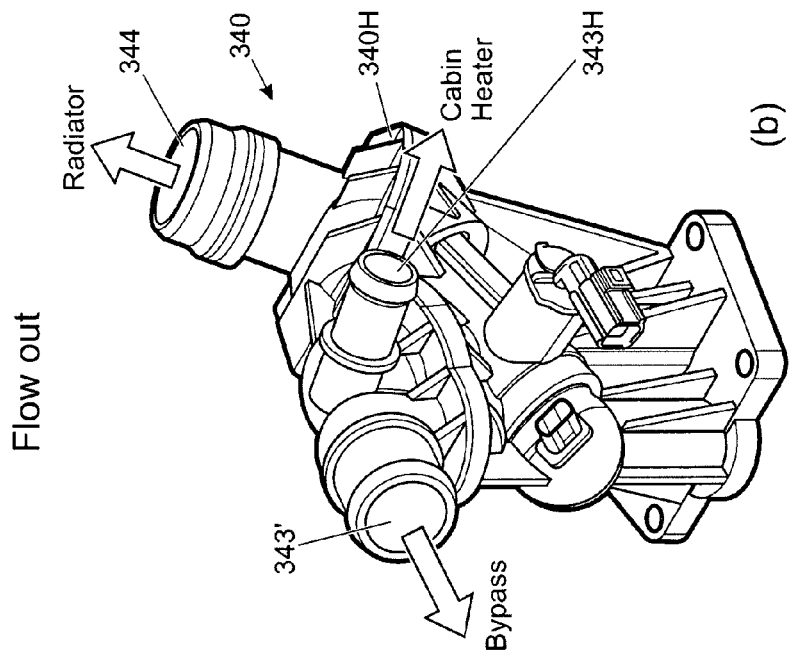
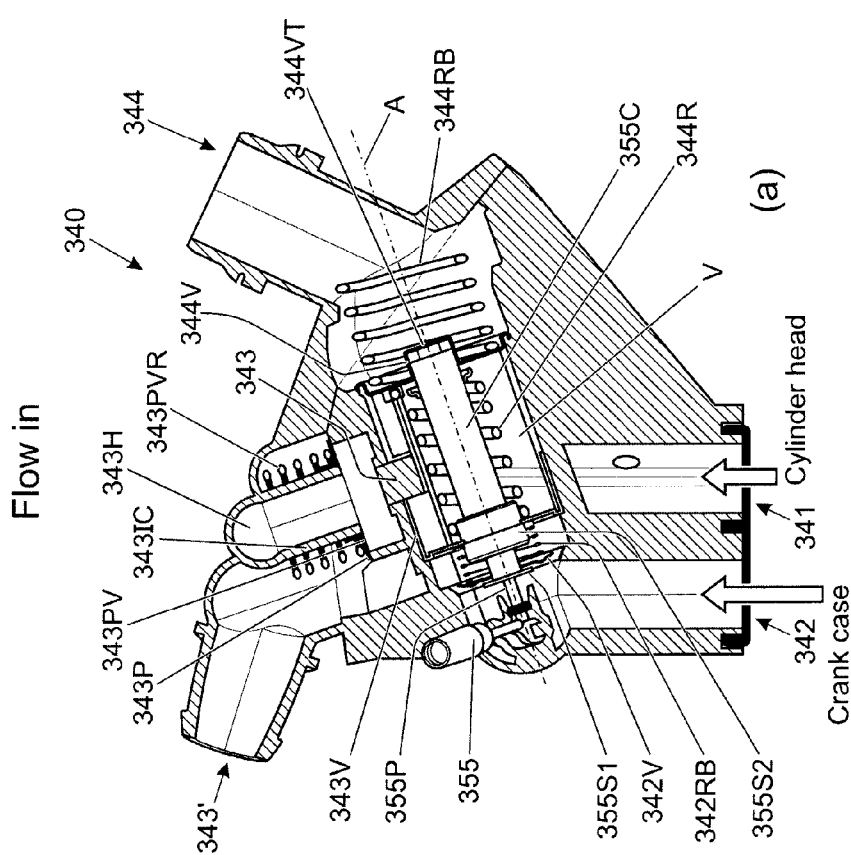
Figure 3A
Figure 3B

METHOD OF CONTROLLING TEMPERATURE

CROSS REFERENCE TO RELATED APPLICATION

This application claims priority from UK Patent Application No. GB1209679.8, filed 31 May 2012, the entire contents of which are expressly incorporated by reference herein.

TECHNICAL FIELD

The present invention relates to a method of controlling a temperature management (cooling) system and more particularly, but not exclusively, to a method of controlling flow of coolant in an engine cooling system for a vehicle. Aspects of the invention relate to a method, to a vehicle and to a program.

BACKGROUND

In a vehicle, such as an automotive vehicle having an internal combustion engine, the temperature of the engine and the temperature of other vehicle components needs to be managed. Typically, known cooling systems for internal combustion engines comprise a pump driven directly by the engine itself. The pump provides a supply of coolant to the engine and to other components of the vehicle. A radiator is typically used to cool the coolant. In this way, as coolant is recirculated by the pump, the coolant continuously cools the engine. The pump and cooling system need to be of a sufficient capacity such that when the engine is operating at a high temperature, the cooling system can nevertheless cool the engine to prevent damage, fatigue or failure of the engine or its components that can be caused if the engine is operated at too high a temperature. A vehicle engine may operate at a high temperature, for example due to the vehicle working hard by travelling uphill, towing a heavy load and/or travelling in a hot climate. Vehicles are typically provided with a cooling system wherein the pump is constantly operated at its maximum output, irrespective of the actual temperature of the engine, the climate the vehicle is in, or the current and changing workload placed on the engine of the vehicle.

However it is not necessary, or indeed beneficial, to constantly provide the maximum cooling of the vehicle engine. In many driving scenarios, little or even no cooling is actually required, but the pump is nevertheless constantly driven and is constantly consuming energy needlessly. Furthermore, it is desirable for optimum fuel efficiency, and to minimise wear on the components of an engine, for the engine to actually operate when it is warm and not too cold. Of particular importance is the temperature of lubricant about the pistons and piston rings. Operation of the engine when the lubricant is below an optimum temperature may have a deleterious effect on the engine. A cooling system operational automatically with the engine and at a constant maximum output, therefore reduces the fuel efficiency of the engine, as well as potentially reducing the service life of the engine or other components. It is desirable to improve the fuel efficiency of vehicles.

The present invention seeks to at least mitigate against or otherwise avoid the problems associated with the prior art by providing an improved method of controlling a cooling system for a vehicle.

SUMMARY

According to one illustrative example embodiment, there is provided a method of controlling temperature of an engine of a vehicle and/or of one or more auxiliary components of the vehicle, the method comprising:
(i) monitoring one or more parameters of the engine, including the temperature of the engine;
(ii) monitoring requirements of the one or more auxiliary components of the vehicle and/or monitoring one or more parameters of the one or more auxiliary components of the vehicle; and
(iii) in dependence upon said monitoring, selecting a cooling mode for a cooling system disposed about said engine and said one or more auxiliary components.

Selecting the cooling mode may be carried out, at least in part, by a control means and each of a plurality of cooling modes may be defined by: a flow rate at which coolant is output by a pump of the cooling system; and the route(s) about the cooling system open to the flow of coolant, which route(s) may be determined in dependence upon whether one or more valve means comprised within the cooling system is closed or open.

Monitoring one or more parameters of the engine, including the temperature of the engine, may further comprise monitoring any one or a combination of: the speed of the engine (RPM), the torque of the engine, the environmental temperature (ambient temperature) and more than one engine temperature obtained at different locations about the engine.

The one or more auxiliary components optionally comprises any one or more of: a radiator, a cabin heater, an LP EGR system, an LP EGR cooler, an LP EGR valve, a HP EGR system, a HP EGR cooler, a HP EGR valve, a transmission system, a transmission oil cooler, a turbo, an air conditioning system and a hybrid system.

Monitoring the requirements of the one or more auxiliary components of the vehicle and/or monitoring the one or more parameters of the one or more auxiliary components of the vehicle optionally comprises any one or a combination of:
(i) monitoring a transmission system of the engine vehicle;
(ii) monitoring the temperature of transmission oil contained within a Transmission Oil Cooler (TOC) of the transmission system;
(iii) monitoring a vehicle cabin heater;
(iv) monitoring a requirement for heating or cooling of the vehicle cabin;
(v) monitoring a Low Pressure Exhaust Gas Regeneration (LP EGR) cooler and/or valve;
(vi) monitoring an LP EGR flow rate;
(vii) monitoring an exhaust gas temperature;
(viii) monitoring an LP EGR coolant temperature;
(ix) monitoring a High Pressure Exhaust Gas Regeneration (HP EGR) cooler and/or valve;
(x) monitoring an HP EGR flow rate;
(xi) monitoring an HP EGR coolant temperature;
(xii) monitoring a hybrid system including one or more components thereof; and
(xiii) monitoring an air conditioning system.

The method may additionally comprise selecting the cooling mode such that a minimum flow rate at which coolant is output by the pump of the cooling system is selected in consideration of: an actual and a desired temperature of the engine, and/or an actual and a desired temperature of one or more of the one or more auxiliary components; and/or the current requirements of one or more of the one or more auxiliary components.

By controlling the flow rate at which coolant is output by the pump, the control means is optionally configured and arranged to select the required cooling mode. The method may further comprise the control means issuing a command signal to the pump, to a drive mechanism for the pump, or to a retarding mechanism disposed about the pump, to control the flow rate at which coolant is output by the pump.

Optionally, controlling the flow rate at which coolant is output by the pump comprises controlling the position of a sleeve or shroud disposed over blades or paddles of the pump and said command signal is issued to an actuator for said sleeve or shroud. The position of the sleeve or shroud is preferably, sufficiently adjustable such that the flow rate of the coolant output by the pump is controllable between a zero flow rate and a maximum flow rate. The position of the sleeve or shroud is adjustable in a step-wise manner or in a continuous manner.

The control means is optionally configured and arranged to actively or passively control said one or more valve means to open or to close said one or more fluid conduits comprised within the cooling system, thereby controlling the route(s) available for the flow of coolant about the cooling system and thereby activating the selected cooling mode.

Optionally, controlling said one or more valve means to open or to close one or more of said one or more fluid conduits comprises controlling the flow rate of the coolant to increase or decrease a pressure differential of the coolant across one of said one or more valve means above or below a threshold pressure differential thereby to cause said one of the one or more valve means to open or to close one or more of said one or more fluid conduits.

Optionally, controlling one of said one or more valve means to open or to close one or more of said one or more fluid conduits comprises actively adjusting the temperature within said one of the one or more valve means above or below a threshold temperature thereby to cause said valve means to open or to close one or more of said one or more fluid conduits.

Optionally, controlling one of said one or more valve means to open or to close one or more of said one or more fluid conduits comprises passively allowing the temperature of the coolant to automatically cause said valve means to open or to close one or more of said one or more fluid conduits.

Selecting the cooling mode may comprise selecting from:
(i) a first series of cooling modes wherein the flow rate of the coolant output by the pump is zero;
(ii) a second series of cooling modes wherein the flow rate of the coolant output by the pump is above zero and equal to or less than a low flow rate;
(iii) a third series of cooling modes wherein the flow rate of the coolant output by the pump is greater than said low flow rate and is below a maximum flow rate; and
(iv) a fourth series of cooling modes wherein the flow rate of the coolant output by the pump is a maximum flow rate.

The engine may be an internal combustion engine comprising a cylinder head having an upper cylinder head and a lower cylinder head and a cylinder block, and the cooling system may comprise:
(i) a first head conduit from the pump through said upper and lower cylinder heads and to a first valve means;
(ii) a second block conduit from the pump, through the cylinder block and to said first valve means;
(iii) a third radiator conduit from said first valve means, through a radiator and to the pump;
(iv) a fourth bypass conduit from said first valve means to a second valve means, through a bypass conduit and to said pump; and
(v) a fifth auxiliary conduit from said first valve means through at least one auxiliary component and to said pump.

Optionally, in the first series of cooling modes, the first and second valve means are closed and coolant does not flow in the first head conduit, the second block conduit, the third radiator conduit, the fourth bypass conduit or the fifth auxiliary conduit.

Optionally, in dependence upon the temperature within said first and/or second valve means or of the coolant being below a first threshold temperature, in a first cooling mode of the second series of cooling modes, coolant does not flow in the second block conduit, the third radiator conduit and the fourth bypass conduit, and coolant does flow in the first head conduit and the fifth auxiliary conduit.

Optionally, in dependence upon the temperature within said first and/or second valve means or of the coolant being above a first threshold temperature, in a second cooling mode of the second series of cooling modes, coolant does not flow in the third radiator conduit and the fourth bypass conduit and coolant does flow in the first head conduit, the second block conduit and the fifth auxiliary conduit.

Optionally, in dependence upon the temperature within said first and/or second valve means or of the coolant being below a first threshold temperature, in a first cooling mode of the third series of cooling modes, coolant does not flow in the third radiator conduit and coolant does flow in the first head conduit, the second block conduit, the fourth bypass conduit and the fifth auxiliary conduit.

Optionally, in dependence upon the temperature within said first and/or second valve means or of the coolant being above a first threshold temperature, in a second cooling mode of the third series of cooling modes, coolant does not flow in the third radiator conduit and coolant does flow in the first head conduit, the second block conduit, the fourth bypass conduit and the fifth auxiliary conduit.

Optionally, in dependence upon the temperature within said first valve means or of the coolant being above a second threshold temperature, in a third cooling mode of the third series of cooling modes, coolant does flow in the third radiator conduit and coolant does flow in the first head conduit, the second block conduit, the fourth bypass conduit and the fifth auxiliary conduit.

Optionally, in dependence upon the temperature within said first and/or second valve means or of the coolant being below a first threshold temperature, in a first cooling mode of the fourth series of cooling modes, coolant does flow in the first head conduit, the second block conduit, the third radiator conduit, the fourth bypass conduit and the fifth auxiliary conduit.

Optionally, in dependence upon the temperature within said first and/or second valve means or of the coolant being above a first threshold temperature, in a second cooling mode of the fourth series of cooling modes, coolant does flow in the first head conduit, the second block conduit, the third radiator conduit, the fourth bypass conduit and the fifth auxiliary conduit.

Optionally, in dependence upon the temperature within said first and/or second valve means or of the coolant being above a second threshold temperature, in a third cooling mode of the fourth series of cooling modes, coolant does flow in the first head conduit, the second block conduit, the third radiator conduit, the fourth bypass conduit and the fifth auxiliary conduit.

Optionally, selecting the cooling mode additionally comprises selecting from:
(i) a fifth series of cooling modes, wherein the flow rate of the coolant output by the pump is greater than the flow rate output by the pump in said third series of cooling modes but is less than the maximum flow rate; and
(ii) in dependence upon the temperature within said first and/or second valve means or of the coolant being below a first threshold temperature, in a first cooling mode of the fifth series of cooling modes, coolant does not flow in the third radiator conduit and coolant does flow in the first head conduit, the second block conduit, the fourth bypass conduit and the fifth auxiliary conduit; and
(iii) in dependence upon the temperature within said first and/or second valve means or of the coolant being above a first threshold temperature, in a second cooling mode of the fifth series of cooling modes, coolant does not flow in the third radiator conduit and coolant does flow in the first head conduit, the second block conduit, the fourth bypass conduit and the fifth auxiliary conduit; and
(iv) in dependence upon the temperature within said first and/or second valve means or of the coolant being above a second threshold temperature, in a third cooling mode of the fifth series of cooling modes, coolant does flow in the third radiator conduit and coolant does flow in the first head conduit, the second block conduit, the fourth bypass conduit and the fifth auxiliary conduit.

The method may further comprise determining an engine temperature from a combination of any two or more of: an engine out coolant temperature, a cylinder head exhaust valve bridge temperature and a cylinder block metal temperature.

The method may additionally comprise monitoring the temperature of the coolant at least at one location within the cooling system.

An illustrative example vehicle comprises an engine and a cooling system that comprises an adjustable pump, at least one valve means, one or more conduits coupled to the engine and to one or more auxiliary components, and a control unit, the control unit being coupled to the adjustable pump and to said at least one valve means and the control unit being structured and arranged to carry out the method according to any of the relevant preceding paragraphs.

An illustrative example program for a control unit of a cooling system is configured and arranged such that when running, the control unit is capable of carrying out the method according to any of the relevant preceding paragraphs.

Within the scope of this document it is expressly intended that the various aspects, embodiments, examples and alternatives, and in particular the individual features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIGS. 3A and 3B are perspective views from the first and second sides respectively of an integrated valve means used in the cooling system of FIG. 2.

DETAILED DESCRIPTION OF EMBODIMENTS

Figure 1:
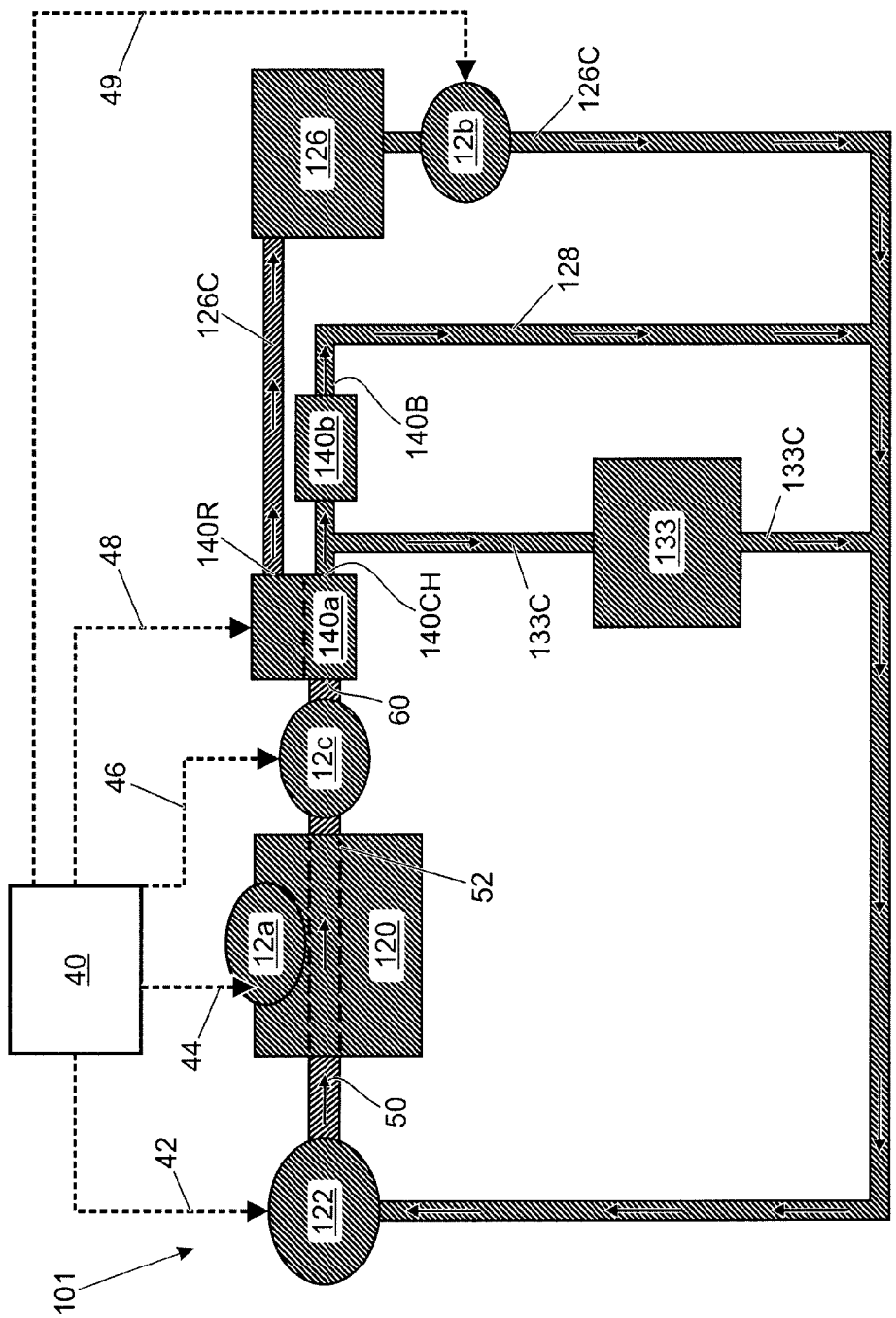
FIG. 1 is a schematic diagram of a cooling system for a vehicle (not shown) according to an embodiment of the disclosure. The cooling system is coupled to an engine of the vehicle and to an auxiliary component 133 of the vehicle.

Detailed descriptions of specific embodiments of the methods, cooling systems, vehicles and programs of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the methods, cooling systems, vehicles and programs described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

The present invention relates to a method of controlling a cooling system for a vehicle. An engine and one or more auxiliary components, that act as heat sources or heat sinks are provided within the cooling system. In dependence upon a variety of factors, as will be described below, a control unit of the cooling system is configured to monitor temperature data received from one or more temperature sensors disposed within the system and monitor data regarding operational requirements of the engine and of one or more auxiliary components of the system. The control unit, in dependence upon this monitoring, selects an appropriate "cooling mode" based upon the actual and desired temperatures of the engine and one or more auxiliary components. The control unit then automatically manipulates the coolant flow rate of an adjustable pump, and automatically closes or opens certain fluid conduits to selectively route coolant about the cooling system in order to efficiently cool and/or heat the engine and said one or more auxiliary components. In this way, the method of the present disclosure enables real time assessment and reactive or passive control of the cooling system to affect only a sufficient and changeable amount of cooling to the engine.

It will be apparent that the cooling system described herein is actually a temperature management system that at times causes or allows an increase in temperature, a decrease in temperature and/or maintenance of temperature. As such, the term "cooling system" should be interpreted to mean a system that effects temperature management, including cooling, heating and/or temperature maintenance. Additionally it will be realised, upon reading the following, that the temperature management system is configured and arranged to concurrently effect heating of one component and cooling of another component in certain "cooling modes".

The method and cooling system may have application outside that of vehicles, and it will be understood that the methods described herein may be applied to cooling systems installed for example, in a building or in industrial machinery.

In FIG. 1 there is shown schematically a first example of a temperature management system 101, also referred to as a cooling system 101 comprising a control unit 40.

The cooling system 101 comprises an adjustable pump 122 for pumping coolant about the cooling system 101, which is a closed loop system. The pump 122 is adjustable in real time such that the flow rate of coolant (and thereby, to some extent at least, the pressure) within the cooling system 101 can be selected based upon the heating and cooling requirements of an engine 120 and one or more auxiliary components 133 of the vehicle that are coupled to the cooling system 101.

It will be recognised that the cooling system 101 may form an integral part of the vehicle and as such the cooling system 101, or at least parts thereof, are disposed or formed within components of the vehicle such as the engine 120. To aid description of the method of controlling a cooling system 101, the cooling system 101 is at times described as though it is a separate system; however it will be understood that the control method of the disclosure, when applied to a cooling system of a vehicle may control vehicle components, such as a pump 122 and cabin heater 133 which, to some readers, may be considered as parts of the vehicle itself and not parts of a separate cooling system.

The pump 122 may be adjustable by, for example, physically retarding the pump 122 (for example using a sleeve disposed over blades or paddles of a centrifugal pump); by varying the pumping frequency or varying piston stroke length (in a reciprocating pump); or varying engine speed. In this way, the flow-rate output by the pump 122 is adjustable and is controlled by the control unit 40. Optionally, the pump 122 may be adjustable in very small increments such that it is effectively continuously adjustable between an off-state and a maximum pumping state. Alternatively and as in the present arrangement, the pump 122 is adjustable in a stepwise manner. In the present embodiment, the pump 122 is adjustable in four steps or states: "zero", "low", "medium" and "high". The pump 122 is coupled to a control unit 40 by a communications link 42. In the present arrangement, the communications link 42 is wireless. The communications link 42 is optionally a wired link in other arrangements or a combination of wired and wireless. The control unit 40 is configured to control or manage the adjustment of the pump 122 to select the flow rate output by the pump 122 in dependence upon a selected "cooling mode", in order to control the flow rate of coolant about the cooling system 101.

A fluid connection 50 connects an outlet of the adjustable pump 122 to the engine 120. The engine 120 is optionally an internal combustion engine of a vehicle (not shown). A fluid conduit 52, through and/or about the engine 120, enables the transfer of heat energy between the coolant in the fluid conduit 52 and the engine 120, including oil lubricant and components of the engine 120.

An outlet of the fluid conduit 52 through and/or about the engine 120 is coupled to an inlet 60 of a first valve means 140a. The first valve means 140a has an inlet 60 and two outlets: a radiator conduit outlet 140R; and an auxiliary conduit outlet 140CH. The radiator conduit outlet 140R is coupled to a radiator conduit 126C arranged to direct coolant to flow through a primary heat sink 126, for example a radiator 126, whereat heat energy is extracted from the coolant to reduce the temperature of the coolant.

The auxiliary conduit outlet 140CH is coupled to a second valve means 140b and to the auxiliary conduit 133C. The second valve means 140b has a single outlet: a bypass conduit outlet 140B. The auxiliary conduit outlet 140CH is coupled to the auxiliary conduit 133C for routing coolant to at least one auxiliary component 133. In the present arrangement, the at least one auxiliary component 133 is a cabin heater heat exchanger 133, and heat energy in the coolant is optionally exchanged to the cabin heater heat exchanger 133 and usefully employed thereby to warm the cabin. In other envisaged embodiments, the heat energy in the coolant may be exchanged to one or more other additional or alternative auxiliary components that require an increase from ambient temperature in order to enhance their performance or in order to meet a demand (also referred to as a "requirement") for heat energy.

The bypass conduit outlet 140B is coupled to a bypass conduit 128 which directs coolant to bypass the radiator (primary heat sink) 126 and to bypass the cabin heater heat exchanger 133 (at least one auxiliary component 133). The temperature of the coolant within the bypass conduit 128 is not substantially altered. This enables coolant flow without causing significant heating or cooling of the coolant to take place, if required.

The bypass conduit 128 is coupled to the radiator conduit 126C downstream of the primary heat sink 126. A downstream end of the auxiliary conduit 133C is coupled to the radiator conduit 126C downstream of the cabin heater heat exchanger 133. Thus, coolant flowing through the radiator conduit 126C, bypass conduit 128 or auxiliary conduit 133C, converges at a common node from which the coolant returns to and is drawn back through the pump 122.

The first valve means 140a can be opened passively and optionally gradually in dependence upon the temperature of coolant flowing to the inlet 60 of the first valve means 140a. When the coolant flowing to the inlet 60 reaches a first threshold temperature T1, the auxiliary conduit outlet 140CH is (gradually) opened to permit coolant to flow in the auxiliary conduit 133C and through the auxiliary component 133.

The first valve means 140a can be opened passively and optionally gradually in dependence upon the temperature of coolant flowing within the first valve means 140a. When the coolant reaches a second threshold temperature T2, the radiator conduit outlet 140R is (gradually) opened to permit coolant to flow in the radiator conduit 126C and through the primary heat sink 126.

Additionally, the first valve means 140a can be opened actively. The first valve means 140a is connected to the control unit 40 by a communications link 48. The communications link 48 may be a direct link or an indirect link. The communications link 48 may be entirely or partially wireless. The temperature within the first valve means 140a is controllable by the control unit 40. The first valve means 140a is electrically heatable by a heating means (not shown), optionally an electrode that is disposed at least partially within the first valve means 140a. A power source (not shown) for the heating means is optionally coupled to the control unit 40 such that the control unit 40 can command the power source to activate or deactivate the heating means. In this way, if required, the control unit 40 is configured and arranged to cause the heating means to heat the first valve means 140a to a sufficient degree such that the first or second threshold temperature T1 or T2 is reached and/or exceeded. The first valve means 140a is structured and arranged such that in dependence upon an electrical control signal issued by the control unit 40 to the heating means of the first valve means 140a, the radiator conduit 140R can be (gradually) opened (or closed) to permit (or prevent) coolant to flow in the radiator conduit 126C and through the radiator 126.

The second valve means 140b can be opened passively in dependence upon the pressure differential across the second valve means 140b. When the coolant pressure differential across at least part of the second valve means 140b reaches a first threshold pressure P1, the bypass outlet 140B is opened to permit coolant to flow in the bypass conduit 128. As such, at the same time as the radiator conduit outlet 140R is opening, the bypass conduit outlet 140B may be (gradually) closing due to a drop in the pressure differential across the second valve means 140b, though if the pressure within the cooling system is sufficiently high when the radiator conduit outlet 140R is opening, then both the radiator outlet 140R and the bypass outlet 140B may be opened simultaneously.

The control unit 40 may be provided with one or more data signals comprising one or more operational parameters. For example, a first temperature sensor 12a is disposed in thermal contact with the engine 120. Optionally, the first temperature sensor 12a is disposed, at least partially, within the engine 120. The first temperature sensor 12a is coupled to the control unit 40 by means of a communications link 44. The communications link 44 is a wireless link, but in other envisaged embodiments, the communications link 44 is a wireless communications link or a combination of wired and wireless communications links 44. Via the communications link 44, the control unit 40 is provided either continuously or intermittently with a first data signal, which comprises temperature data from the first temperature sensor 12a. The first data signal is repeatedly issued, continuously or intermittently, to the control unit 40 to update the control unit 40 with temperature data that is indicative of the temperature of the engine 120, in real time. This operational parameter may be referred to herein as the engine temperature. In this way monitoring of one or more parameters of the engine 120 including the temperature of the engine 120 may be carried out.

A second temperature sensor 12b is positioned in the radiator conduit 126C. (Optionally, the second temperature sensor 12b is positioned at the downstream end of the radiator (primary heat sink 126)). The second temperature sensor 12b is coupled to the control unit 40 by means of a communications link 49. The communications link 49 is optionally a wired link, but in the present arrangement is a wireless communications link 49. Via the communications link 49 the control unit 40 is provided either continuously or intermittently with a second data signal, which comprises temperature data from the second temperature sensor 12b. The second data signal is repeatedly issued in real time to continuously or intermittently update the control unit 40, with temperature data that is indicative of the temperature of coolant output from the radiator 126, in real time. In other envisaged embodiments, the second temperature sensor 12b may be disposed within the radiator 126. This operational parameter may be referred to herein as the second coolant temperature.

A third, optional, temperature sensor 12c may be positioned between the outlet from the engine 120 and the inlet of the first valve means 140a. The third temperature sensor 12c is coupled to the control unit 40 by means of a communications link 46. The communications link 46 is optionally a wired link, but in the present arrangement is a wireless communications link 46. Via the communications link 46, the control unit 40 is provided either continuously or intermittently with a third data signal which comprises temperature data from the third temperature sensor 12c. The third data signal is repeatedly issued in real time to continuously or intermittently update the control unit 40 with temperature data that is indicative of the temperature of the coolant exiting the engine 120, in real time. This operational parameter may be referred to herein as the third coolant temperature.

The control unit 40 may be provided, in real time, with one or more additional data signals comprising values of one or more additional operational parameters. Such operational parameters may relate to the operational requirements or demands of the engine 120 and/or the cabin heater heat exchanger (one or more auxiliary components) 133. Such operational parameters may relate to the ambient temperature; the engine load; the vehicle speed; the engine speed; and the driving mode (e.g. towing mode, sand mode). The cabin heater heat exchanger 133 may have a heater 133 having an on-state and an off-state and one or more controllable levels (for example low heating, medium heating, high heating) in between. The state of the cabin heater heat exchanger 133 may be issued to the control unit 40, continuously or intermittently, in real time, in order to update the control unit 40 as to whether there is a requirement for a supply of heat at the cabin heater heat exchanger 133 and if required, at which level (for example, low, medium, high).

The engine 120 has a temperature $T_i$ at any given time $t_i$, which temperature $T_i$ may be determined by the first temperature sensor 12a. In envisaged embodiments, the temperature of the engine 120 may be determined from one or more, or a combination of, any two or more of: an engine out coolant temperature (12c), a first engine sensor (for example a cylinder head exhaust valve bridge temperature sensor) and/or a second engine sensor (for example a cylinder block metal temperature). Alternatively, the highest of any such sensed temperatures may be adopted as the determined engine temperature $T_i$.

The instant temperature $T_i$ of the engine 120 at a time $t_i$ depends upon a range of factors at least including: the rate at which the engine 120 is working; the ambient temperature; the length of time the engine 120 has been operational; the temperature of coolant flowing in the engine 120; the pressure of the system 101; and the flow rate of the pump 122. The engine 120 has a minimum optimum temperature $T_1$, below which the engine 120 may not perform optimally and may be susceptible to an undesirable level of wear and fatigue (particularly due to the low temperature of lubricant for the pistons). Advantageously therefore, the control unit 40 is configured to allow the engine 120 to reach its minimum optimum temperature $T_1$ as quickly as possible, having due regard to and/or optionally prioritising the heating or cooling requirements of the one or more auxiliary components 133 coupled to the cooling system 101.

To do this, typically, the coolant is not permitted to flow in the radiator conduit 126C until the minimum optimum temperature $T_1$ of the engine 120 has been reached by operating the pump 122 in the "zero" state and optionally fully closing the first valve means 140a. (The minimum optimum temperature $T_1$ preferably substantially corresponds to the threshold temperature T1, at which the auxiliary conduit outlet 140CH is (gradually) opened to permit the coolant to flow in the auxiliary conduit 133C and through the auxiliary component 133). Furthermore, the engine 120 has a maximum optimum temperature $T_2$ above which the engine 120 may not perform optimally and may be susceptible to an undesirable level of wear and fatigue. Finally, the engine 120 has a critical temperature $T_3$, at or above which critical temperature $T_3$, imminent and possibly fatal damage to the engine 120 may occur. It is desirable to maintain the instant temperature $T_i$ of the engine 120 between the minimum optimum temperature $T_1$ and the maximum optimum temperature $T_2$. The temperature range defined by the minimum optimum temperature $T_1$ and the maximum optimum temperature $T_2$ may be referred to as an optimum operating range defined as: $T_1 \leq T_i \leq T_2$. In order to: ensure the safe operation of the engine 120; to provide a temperature management system 101 that is cost effective and efficient; to preserve the lifetime of the engine 120; and to manage optimum operation of one or more auxiliary components 133 within the system 101, the control unit 40 is configured and arranged to:

(i) prevent the temperature $T_i$ of the engine 120 exceeding the critical temperature $T_3$;
(ii) cause the temperature $T_1$ of the engine 120 to reach the minimum optimum temperature $T_1$ as quickly as possible;
(iii) maintain the temperature $T_i$ of the engine 120 within the optimum operating range ($T_1 \leq T_i \leq T_2$) for as much of the operational time of the engine 120 as possible;
(iv) minimise the energy consumption of the pump 122;
(v) ensure the auxiliary components 133 of the cooling system 101 are supplied with a necessary amount of heating or cooling in order to meet user demands or other requirements placed upon those auxiliary components 133 and/or to maintain optimum operating temperature conditions for those auxiliary components 133.

The control unit 40 is therefore programmed to manage the real time demands (also referred to as "requirements") of the engine 120 and the one or more auxiliary components 133. As a result of the adjustable pump 122, and the passive opening of the first valve means 140a when coolant temperature exceeds T1 and T2 respectively or coolant pressure differential across the second valve means 140b exceeds a threshold pressure P1, there are, in this arrangement, twelve selectable "cooling modes" for the cooling system 101 of the presently illustrated arrangement. Each of these selectable "cooling modes" is defined by the available routes for coolant flow within the cooling system 101 and the pump 122 flow rate. Table 1.1 below illustrates each of these "cooling modes" (which may also be grouped as a series of cooling modes based upon the operational states of the pump 122). Table 1.1 shows the route(s) available for coolant flow in each of the cooling modes. "YES" means that coolant can flow in the listed conduit at the given pump 122 state and given first valve means 140a temperature, whereas "NO" means that coolant cannot flow in the listed conduit at the given pump 122 state and the given first valve means 140a temperature.

TABLE 1.1

Available "Cooling Modes" of Cooling System 101 of first illustrated arrangement.

| State of Pump 122 | Coolant Flow Route | Below T1 | At or above T1 and below T2 | At or above T2 |
|---|---|---|---|---|
| | FIRST SERIES | COOLING MODE 1 | COOLING MODE 2 | COOLING MODE 3 |
| ZERO | Auxiliary conduit 133C | NO | NO | NO |
| | Bypass conduit 128 | NO | NO | NO |
| | Radiator conduit 126C | NO | NO | NO |
| | Engine conduit 52 | NO | NO | NO |
| | SECOND SERIES | COOLING MODE 4 | COOLING MODE 5 | COOLING MODE 6 |
| LOW | Auxiliary conduit 133C | YES | YES | YES |
| | Bypass conduit 128 | NO | NO | NO |
| | Radiator conduit 126C | NO | NO | YES |
| | Engine conduit 52 | YES | YES | YES |
| | THIRD SERIES | COOLING MODE 7 | COOLING MODE 8 | COOLING MODE 9 |
| MEDIUM | Auxiliary conduit 133C | YES | YES | YES |
| | Bypass conduit 128 | YES | YES | YES |
| | Radiator conduit 126C | NO | NO | YES |
| | Engine conduit 52 | YES | YES | YES |
| | FOURTH SERIES | COOLING MODE 10 | COOLING MODE 11 | COOLING MODE 12 |
| HIGH | Auxiliary conduit 133C | YES | YES | YES |
| | Bypass conduit 128 | YES | YES | YES |
| | Radiator conduit 126C | YES | YES | YES |
| | Engine conduit 52 | YES | YES | YES |

The cooling mode of the system 101 is selected by the control unit 40 in real time and in dependence upon operational parameters that are monitored by the control unit 40. Once the control unit 40 has carried out sufficient monitoring (which may be carried out in discrete time periods so that received data can be averaged for smooth control), the control unit 40 selects, in dependence upon the operational parameters, a "cooling mode" and takes action, if necessary to ensure that the selected "cooling mode" is adopted by the cooling system 101. The control unit 40 then issues command signals as appropriate to cause the adjustable pump 122 to operate at the required pump rate ("zero", "low", "medium" or "high") and either passively or actively manages the first and/or second valve means 140a, 140b. The control unit 40 may refer to one or a series of look-up maps (not shown) stored within a memory associated with the control unit 40 in order to determine which "cooling mode" is required based upon the current set of monitored operational parameters. Optionally, the number of reference maps matches the number of available pump operational states and as such, in the present embodiment there are four such reference maps. Each reference map enables the control unit 40 to achieve the desired pressure and flow rate for the cooling system 101, optionally for four categories of vehicle condition (see below). The desired coolant flow is thereby selected from one of the four reference maps. Each of these maps uses a number of inputs, for example engine speed and desired torque, to determine a flow rate for the current vehicle operating condition.

The four categories of vehicle condition in this embodiment are:—
 (i) Zero coolant flow;
 (ii) Minimal coolant flow to allow coolant flow around the cylinder head and provide heat to the cabin heater;
 (iii) Normal flow, providing cooling to the engine, (and optionally to the transmission and other exhaust mounted components, see second embodiment), and providing heat to the cabin heater 133;
 (iv) Extreme engine and vehicle cooling, providing maximum possible cooling performance.

The reference maps are preferably optimised to meet the needs of different engines and vehicles to which the cooling system 101 is applied. The reference maps are also preferably optimised to avoid inadvertently changing cooling modes due to engine and driver transient behaviour. This may be in addition to, or as an alternative to, the control unit 40 monitoring the various operating parameters over a period of time before determining which "cooling mode" should be selected.

In other envisaged arrangements, the control unit 40 may carry out a computation instead of or in addition to referencing one or more maps. The computation may give a weighting to the operational parameters monitored by the control unit and may thereby determine, in dependence upon the operation of the engine 120 and the one or more auxiliary components 133 a required "cooling mode" (in other words a required combination of coolant flow route(s) and coolant flow rate).

Once the required "cooling mode" has been selected, the control unit 40 is configured to cause the cooling system 101 to adopt the required "cooling mode". This may or may not require any active changes or may comprise actively operating the first valve means 140a and/or the pump 122. The control unit 40 is not limited to only the passive operation of the first valve means 140a.

An example of an operating routine that may be carried out by the cooling system 101 will now be described in more detail below with respect to a specific driving sequence. It will be understood that the following driving sequence is merely an example of a series of scenarios that the vehicle, engine 120 and cooling system 101 may experience and that the control strategy of the present disclosure covers a wide variety of driving scenarios.

(1) Engine Stopped—Engine Cranking

A stationary vehicle with a stopped engine 120 is disposed in an environment having a relatively "normal" ambient temperature of about 10° C. which is below T1, the vehicle has not been driven for a period of time and as such the engine 120 has a temperature substantially matching the ambient temperature, which is below T1. When the engine 120 is initially started (cranked), the control unit 40 is provided with data relating to:
 (i) Coolant temperature, which in the present scenario is about or below 10° C. and is below T1; (Optionally the coolant temperature is determined by the second temperature sensor 12b. Additionally or alternatively, in other envisaged embodiments, the coolant temperature may be determined by a further temperature sensor disposed within or by the pump 122.)
 (ii) Ambient temperature, which in the present scenario is about 10° C.; (The data relating to the ambient temperature about the vehicle may optionally be provided by a temperature sensor disposed on the vehicle. Such a sensor may provide the control unit 40 and/or another control unit of another vehicle system with data relating to the ambient temperature. Where ambient temperature data is obtained by another vehicle system, this data may be relayed to the control unit 40 of the cooling system 101 directly or by means of a communications network, for example the vehicle's Controller Area Network (CAN).)
 (iii) Pump shroud position, the position of the shroud disposed about the pump 122 is optionally dependent upon the "cooling mode" of the cooling system 101 when the engine 120 was last used. However, under the current temperature conditions, after starting the engine, the control unit 40 will cause the shroud to be driven to the closed, "zero-flow" position. It is envisaged that the last used shroud position may be stored by the control unit 40. A feedback sensor (not shown) is optionally disposed proximate to the pump 122 and/or a shroud (not shown), which feedback sensor is configured to determine the position of the shroud and thereby the "operational state" of the pump 122. In a preferred, but nevertheless optional, arrangement, the feedback sensor is either coupled to an actuator for the shroud or is comprised within the actuator for the shroud for causing an adjustment in the shroud position. The control unit 40 is thereby coupled to a single feedback sensor suitable both for receiving data about the current shroud position and for issuing commands to adjust the shroud position.
 (iv) Additional data—additional data, for example from the one or more auxiliary components, first and third temperature sensors and from other systems of the vehicle relating to engine speed (rpm), engine torque and other parameters, may be provided to the control unit 40. The control unit 40, in some embodiments, may use this data to conduct additional checks to more confidently determine that the engine is in a cold starting scenario.

Based upon the engine temperature and coolant temperature both being below T1, the control unit 40 is configured to determine that the first cooling mode of the first series of cooling modes ("Cooling Mode 1") should be selected to allow the engine to warm-up to a preferred operating temperature as quickly as possible. The control unit 40 causes the shroud to be driven to the closed "zero-flow" state and the first and second valve means 140a, 140b are passively managed by the control unit 40, meaning that the first and second valve means 140a, 140b both remain closed. Coolant does not flow within the system 101 and the engine 120 is allowed to warm-up.

(2) Steady Driving

A user of the vehicle drives steadily and switches a cabin heater on to warm the cabin of the vehicle. The control unit 40 continues to conduct monitoring of:
  (i) one or more parameters of the engine 120 including the temperature of the engine 120;
  (ii) requirements of the cabin heater 133 of the vehicle; and/or
  (iii) of one or more parameters of the cabin heater of the vehicle.

The control unit 40 determines that the temperature of the engine 120 is now warm, that coolant in the fluid conduit 52 is about T1, that there is a requirement for cabin heat and that the cabin heater 133 is therefore below a desired temperature. In dependence upon said monitoring, the control unit 40 therefore selects the second cooling mode of the second series of cooling modes ("Cooling Mode 5"). The control unit issues a command to cause the pump 122 to adopt the second operating state "LOW" and identifies that the coolant temperature T1 is sufficient to cause the auxiliary conduit outlet 140CH to open and that coolant at temperature T1 (and increasing) will flow to the cabin heater heat exchanger 133 to provide heat to the cabin heater as required.

(3) High Ambient Temperature and/or Harder Driving

The vehicle is driven harder due to the vehicle towing a considerable load. The coolant temperature may not yet have exceeded temperature T2, but upon monitoring the engine load and activation of towing mode, the control unit 40 may be configured to select the third cooling mode of the fourth series of cooling modes i.e. cooling mode 12. To achieve this, the control unit commands the pump to adopt a "high" pumping state (by lifting the shroud) and actively causes the radiator conduit outlet 140R to open by causing heating of the first valve means 140a until its temperature exceeds T2. The control unit 40 may continue to heat the first valve means 140a during the period in which the coolant temperature is below T2.

In the event of the detection of a failure of one or more components or sensors within the cooling system 101, the control unit 40 may be configured to automatically adopt cooling mode 11 or 12 to ensure that maximum cooling is carried out as a safety precaution to ensure that the temperature of the engine 120 does not exceed a critical temperature $T_3$.

A second embodiment of the method of the present disclosure will now be described with reference to a second illustrated cooling system 201, also for a vehicle (not shown). In the second embodiment, like reference numerals have, where possible, been used to denote like features, albeit with the numbering increased to numbering in the "200s" rather than "100s" or to numbering in the "100s" rather than in the "10s" to distinguish the features of the second embodiment from those of the first embodiment. Since many features are common to both embodiments, only the differences in the second embodiment compared to the first embodiment will be described in detail.

Figure 2:
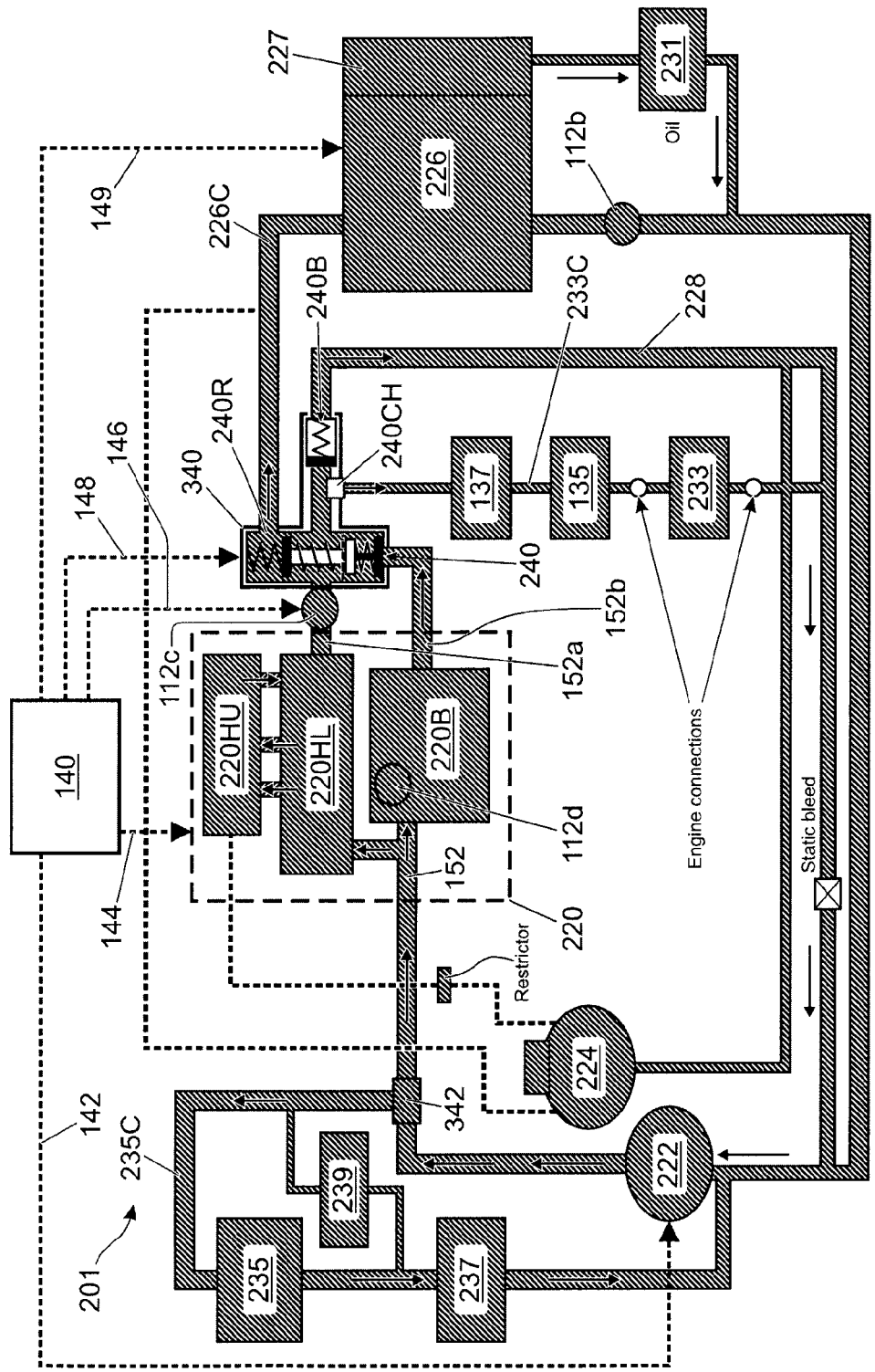
FIG. 2 is a schematic diagram of a cooling system for a vehicle (not shown) according to another embodiment of the disclosure. The cooling system is coupled to an engine of the vehicle and to a plurality of auxiliary components of the vehicle.

The cooling system 201 is again for a vehicle comprising an engine 220 in the form of an internal combustion engine 220. The internal combustion engine 220 comprises a cylinder block 220B, and a split cylinder head comprising: an upper cylinder head 220HU and a lower cylinder head 220HL. In FIG. 2, the cooling system 201, engine 220 and a plurality of auxiliary components 226, 227, 231, 135, 137, 233, 224, 235, 237, 239 are shown schematically. The auxiliary components in this illustrated arrangement optionally include: a radiator 226 disposed within the radiator conduit 226C; a sub cooler unit 227 coupled to a transmission oil cooler (TOC) unit 231; a High Pressure Exhaust Gas Regeneration (HP EGR) cooler unit 135; an Exahust Gas Regeneration (EGR) valve 137; a cabin heater 233; a degasification unit 224; an engine oil cooler unit 235; a Low Pressure Exhaust Gas Regeneration (LP EGR) cooler unit 237; and a Turbo 239. In other embodiments it is envisaged that the one or more auxiliary components additionally or alternatively includes: an air conditioning system and a hybrid system of a hybrid-electric car comprising a rechargeable battery pack. Monitoring of the one or more auxiliary components may also therefore comprise monitoring the hybrid system including, for example, the battery pack, cells, motors and clutches thereof.

A fluid flow path 152 extends within the cylinder block 220B, the upper cylinder head 220HU and the lower cylinder head 220HL. A coolant outlet of each of the cylinder head portion 220HU and cylinder block portion 220B is coupled to a respective inlet of an integrated valve module (IVM) 340. The IVM 340 has three outlets: a radiator conduit outlet 240R; a bypass conduit outlet 240B; and an auxiliary conduit outlet 240CH. The radiator conduit outlet 240R is coupled to a radiator conduit 226C arranged to direct coolant to flow through a radiator 226. The bypass conduit outlet 240B is coupled to a bypass conduit 228 and as before, directs coolant to bypass the radiator 226. The bypass conduit 228 is coupled to the radiator conduit 226C downstream of the radiator 226. The auxiliary conduit outlet 240CH is coupled to an auxiliary conduit 233C that directs coolant through a High Pressure Exhaust Gas Regeneration (HP EGR) cooler 137, an Exhaust Gas Regeneration (EGR) valve 135, and a cabin heater matrix or cabin heater heat exchanger 233. A downstream end of the auxiliary conduit 233C is optionally coupled to the radiator conduit 226C downstream of the radiator 226. Thus, coolant flowing through the radiator conduit 226C, radiator bypass conduit 228 or cabin heater heat exchanger 233 may converge at a common node from which the coolant is drawn through the pump 222. In the embodiment of FIG. 2 the coolant pump 222 also delivers pressurised fluid to a coolant inlet of a second auxiliary conduit 235C in which an engine oil cooler 235 is connected in series with a low pressure exhaust gas recirculation (LP EGR) cooler 237. A coolant outlet of the LP EGR cooler 237 is coupled to an inlet of the coolant pump 222.

A degassification (degas) tank 224 is optionally provided in fluid communication with the radiator bypass conduit 228, a coolant volume within the upper cylinder head 220HU and the radiator conduit 226C. The degas tank 224 allows air bubbles within the coolant system 201 to be collected in the air space at the top of the degas tank 224.

Figure 4:
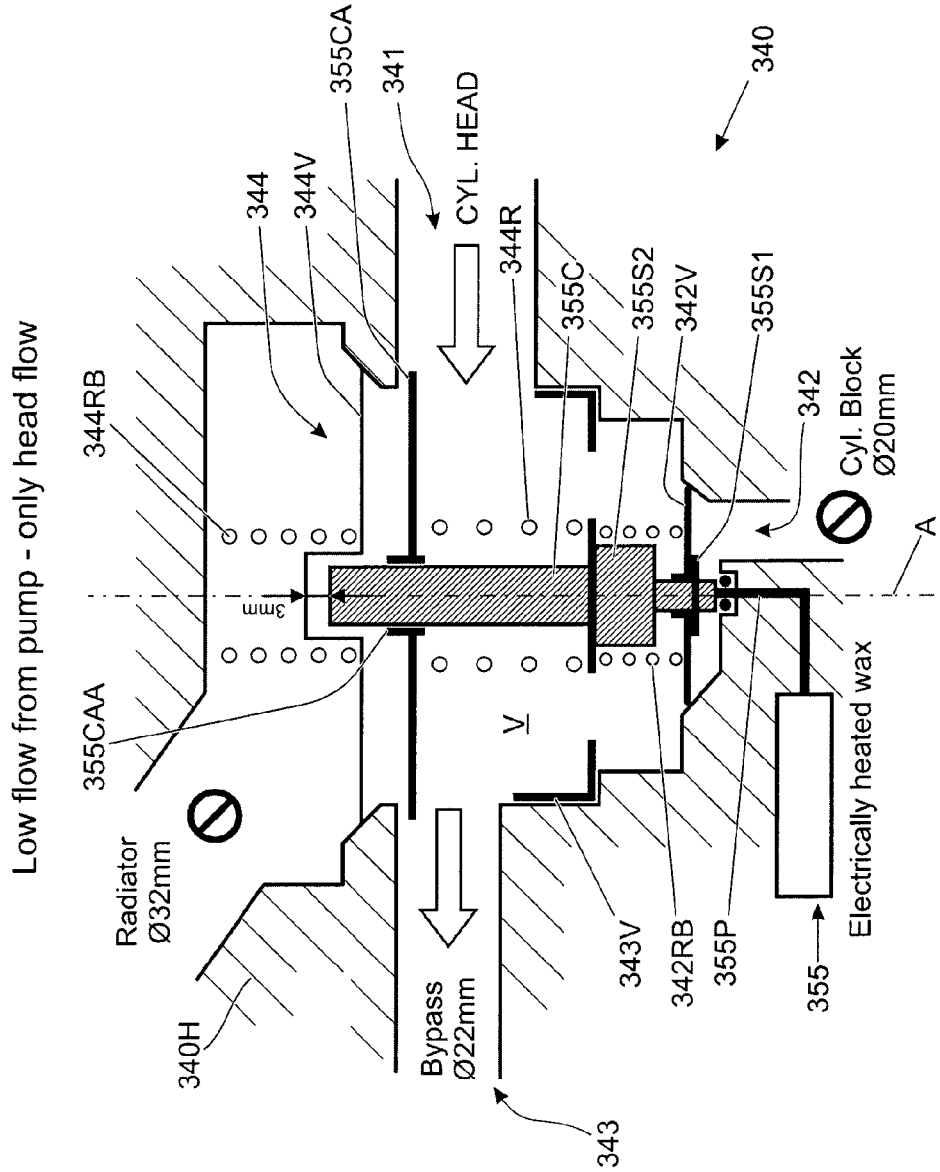
FIG. 4 is a schematic illustration of an integrated valve means used in the cooling system of FIG. 2.

The optional structure of a form of integrated valve module 340 that may be used in a cooling system configured to carry out a cooling strategy according to the disclosure is shown in further detail in FIGS. 3A, 3B and 4. It will be recognised that other forms of valve means may be used and that such valve means may not be intergrated into a single module. Returning to FIGS. 3A, 3B and 4, a body portion of the IVM 340 providing a housing 340H defines a cylinder head fluid inlet (CHI) aperture 341, a cylinder block fluid inlet (CBI) aperture 342, a radiator bypass outlet (RBO) aperture 343 and a radiator outlet (RO) aperture 344. Valve members 342V, 343V, 344V are provided, the valve members being operable to seal against portions of the housing defining the CBI aperture 342, RBO aperture 343 and RO aperture 344 respectively in order to close the apertures when required.

An actuation assembly 355 is optionally provided, the assembly being operable to move the valve members 342V, 343V, 344V from open to closed positions in a reversible manner responsive to a temperature of coolant flowing through the IVM 340. The actuation assembly 355 has a piston 355P operable to slide within the cylinder 355C of the assembly 355. The piston 355P is provided in a fixed position with respect to the housing 340H. The cylinder 355C protrudes through the CBI inlet valve member 342V and into an inner coolant volume V of the IVM 340. The cylinder 355C is exposed to a flowstream of coolant flowing into the IVM 340 through the CHI aperture 341 and the CBI aperture 342 when the CBI aperture 342 is open.

It is to be understood that the cylinder 355C is operable to move with respect to the piston 355P due to thermal expansion or contraction of a wax material. A cylinder support member in the form of a support arm 355CA is provided within the inner coolant volume V. The arm 355CA is fixedly coupled to the housing 340H and provided with an aperture 355CAA through which the cylinder 355C passes with a relatively small gap between the cylinder arm aperture 355CAA and cylinder 355C. The arm 355CA is thereby able to constrain lateral movement of the cylinder 355C (normal to longitudinal axis A thereof). A resilient spring member 344R is arranged to bias the cylinder 355C in a direction towards piston 355P by pushing against the support arm 355CA at one end and a portion of the RBO valve member 343 at the other.

The RBO valve member 343V is fixedly coupled to the cylinder 355C and arranged to move therewith as the cylinder 355C slides away from and toward the piston 355P. The RBO valve member 343V and RO valve member 344V are optionally movable independently of one another.

One end of the cylinder 355C passes through the CBI inlet valve member 342V. The cylinder 355C has respective first and second stop members 355S1, 355S2 provided therearound at spaced apart locations along a longitudinal axis A thereof. The stop members 355S1, 355S2 are provided on opposite sides of the CBI inlet valve member 342V. The CBI inlet valve member 342V is slidable parallel to the longitudinal axis A of the cylinder 355C between the stop members 355S1, 355S2, but is prevented from sliding past the stop members 355S1, 355S2.

A CBI inlet valve member blowpast spring member 342RB is arranged to bias the valve member 342V towards the first stop member 355S1. One end of the blowpast spring member 342RB acts against the CBI inlet valve member 342V whilst the other end acts against a portion of the RBO valve member 343V. As noted above, the RBO valve member 343V is fixedly coupled to the cylinder 355C and is substantially immovable with respect thereto.

In the particular configuration illustrated in FIG. 4 the wax material within cylinder 355C is below its melting temperature T1, and the cylinder member 355C is positioned substantially at one extreme of its range of movement. The CBI inlet valve member 342V is in a substantially closed position and flow of coolant through the CBI inlet aperture 342 is therefore prevented.

However if a pressure of coolant in the CB portion 220B of the engine 220 is sufficiently high, the CBI inlet valve member 342V may be displaced against the bias of blowpast spring member 342RB, allowing coolant to flow through the CBI aperture 342. In some embodiments the CBI valve member 342V may be so displaced when the valve member 342V is closed at a medium or high pump 222 state. In some embodiments the valve member 342V may be arranged to move to an open position at a different pump 222 state.

The RO valve member 344V is provided at an opposite end of the cylinder 355C to the CBI valve member 342V. In the embodiment of FIG. 4 a gap is provided between the RO valve member 344V and a free end of the cylinder 355C when the coolant temperature is below T1. The gap is provided by a well region formed in the RO valve member 344V. The free end of the cylinder 355C moves into this well region as the cylinder 355C is initially displaced as the coolant temperature rises through T1. The shape of the RO valve member 344V may be described as a substantially 'top-hat' shape in the embodiment shown although other arrangements are also useful. Importantly, in some embodiments the actuation assembly is permitted to cause the cylinder 355C or like member to move a certain distance when the coolant temperature initially rises above T1, opening CBI aperture 342, before RO aperture 344 is opened.

The RO valve member 344V is biased in a direction towards the cylinder 355C and into abutment with a portion of the housing 340H defining the RO aperture 344 by means of a resilient blowpast spring member 344RB. When the coolant temperature is below T1 the RO valve member is able to close the RO aperture 344 as noted above. However, if a pressure of coolant in the inner coolant volume V exceeds a prescribed value, the valve member 344V may be displaced to open the RO aperture 344 against the bias of blowpast spring member 342RB, allowing flow of coolant through the RO aperture 344. Advantageously this allows relief of coolant pressure within the IVM 340 (and therefore within engine 220) at higher pump flow rates. Since an amount of thermal energy required to be dissipated increases at higher engine speeds, opening of the RO aperture 344 allows increased cooling of coolant.

As the temperature of coolant flowing through the IVM 340 increases through T1, wax material between the piston 355P and cylinder 355C melts. The resulting expansion of the wax causes displacement of the cylinder 355C in an axial direction away from the piston 355P. As the cylinder 355C is so displaced, CBI valve member 342V moves to an open position and RBO valve member 343V moves toward a closed position. However the RBO valve member 343V is arranged such that it does not begin to block the RBO aperture 343 until the RO aperture 344 has begun to open as described below.

The RO valve member 344V remains in the closed position as the coolant temperature rises through T1 but a gap between the free end of the cylinder 355C and RO valve member 344V decreases. Coolant is able to flow into the IVM 340 through both the CHI aperture 341 and CBI aperture 342. Coolant is able to flow out from the IVM 340 through the RBO aperture 343 only.

When the temperature of coolant exceeds a radiator outlet (RO) valve opening temperature T2, the cylinder 355C moves a sufficient distance to contact the RO valve member 344V and causes the valve member 344V to be displaced to an open position against the bias of spring member 344RB.

As the cylinder 355C displaces the RO valve member 344V, the RBO valve member 343V begins to close RBO aperture 343.

As the coolant temperature rises to a radiator bypass outlet (RBO) valve closure temperature T4 the cylinder 355C displaces to a position where the RBO valve 343V is closed at or immediately above T4. At this temperature both the CBI inlet aperture 342 and RO aperture 344 are fully open.

It is to be understood that, upon cooling, movement of the cylinder 355C and valve members 342V, 343V and 344V is the reverse of that described above.

It is to be understood that the actuation assembly may comprise electrical heating means operable to heat wax material in the cylinder 355C when it is required to open one or more of the CBI aperture 342, RBO aperture 343 and RO aperture 344. The cylinder 355C, 255C may contain a wax material having two or more different wax media of different respective melting points. For example one wax medium may melt at or around temperature T1 whilst another wax medium may melt at or around temperature T2. A third wax medium may be provided in some embodiments having a different melting temperature to the other two media.

Fluid passing out from the inner coolant volume V through RBO aperture 343 may pass through a first outlet 343' that is arranged to be coupled to the radiator bypass conduit 228 (FIG. 2) or a second outlet 343H that is arranged to be coupled to the cabin heater heat exchanger 233 (FIG. 2). The RBO valve member 343V is arranged such that when the RBO aperture 343 is closed, a relatively small amount of coolant is permitted to flow past the valve member 343V to the second outlet 343H and thereby to the heat exchanger 233. However an RBO PRV 343P is provided between the RBO aperture 343 and the first outlet 343'. The RBO PRV 343P is arranged to prevent flow of coolant therepast unless the pressure of coolant exceeds a critical value. The RBO PRV 343P is arranged whereby when the RBO valve member 343V is closed the pressure of coolant is insufficient to cause the valve 343P to open under normal engine operating conditions.

The RBO PRV 343P has an annular valve member 343PV. The valve member 343PV is provided around an internal conduit 343IC that feeds coolant from the RBO aperture 343 to the second outlet 343H. The valve member 343PV is operable to open against the bias of a resilient spring member 343PVR, allowing coolant to flow from the RBO aperture 343 to the first outlet 343'. The feature of an annular valve member 343PV allows a relatively compact design to be achieved.

An electrically heated thermostat allows for the IVM 340 to be activated by the control unit 140 so that the control unit 140 can actively cause the IVM 340 to open. This may be required as explained above, for example in the scenario that one or more operating parameters of the engine, vehicle or one or more auxiliary components indicates a high engine load or a failure. In other words, the electrically heated thermostat permits the reduction of the coolant temperature at which the IVM's 340 can be opened. Under certain engine operating conditions, determined from information for example, including engine speed, torque, and temperatures and/or driving style, it will be advantageous to open the block flow valve at lower temperatures. In these conditions a heating offset may be applied to the thermostat as stated so that the appropriate cooling mode can be actively and automatically selected and adopted.

To ensure that there are no large fluctuations (or at least to minimise the number or size of fluctuations) in engine out coolant temperature the electrical heating may be deactivated before the thermostat reaches its second opening temperature T2 (at which temperature, coolant is flowed to the cooling radiator 226). In some embodiments, this is not the case and the electrically heated thermostat can be used to select cooling mode 12.

Under certain engine operating conditions, determined from information including engine speed, engine torque, engine, coolant and other measured temperatures and driving style it may be advantageous to cause the radiator flow valve 240R to open at a lower temperature. In these conditions a heating offset is applied to the thermostat.

The advantage gained from this lower opening point can include: extra engine 220 and/or auxiliary component cooling in extreme operation (for example, high engine loads, high vehicle speed, driving in sand, towing a trailer or another vehicle (for example a caravan)); extra engine 220 and/or auxiliary component cooling in extreme ambient conditions; and/or increased engine performance due to lower combustion chamber and inlet gas temperatures.

In the second embodiment, there are again, optionally four pump operational states and due to the configuration of the optional IVM 340 the cooling system 201 can be operated in any one of twelve cooling modes as set out below, in dependence on the temperature of the coolant and/or IVM and/or in dependence on the pump 222 state. Table 2.2 below sets out the route(s) available for the flow of coolant in the cooling system 201 of the second illustrated embodiment of the disclosure. It can be seen that in a second series of cooling modes, when the pump is operating in a "low" state, the IVM 340 permits coolant flow in the upper and lower cylinder heads 220 HU, 220 HL whilst simultaneously restricting flow within the cylinder block 220B. Advantageously, the control unit 40 can, in selecting the fourth cooling mode, enable the engine block 220B (and lubricant therein) to warm-up whilst providing a flow of coolant to the auxiliary conduit 233C and the components coupled thereto.

Optionally, the cooling system 201 may additionally comprise a further valve means 342 which can be used to restrict or allow coolant to flow about the second auxiliary conduit 235C (which may also be referred to as a second auxiliary circuit 235C). The further valve means may be controllable remotely, actively or passively. In embodiments where the further valve means is controllable remotely and actively, it may be controlled by a control unit for the system in which the components of the second auxiliary circuit 235C are part, such as an EGR system or may be controlled by the control unit 140 of the cooling system 140.

TABLE 2.1

Available "Cooling Modes" of Cooling System 201 of second illustrated arrangement.

| State of Pump 222 | Coolant Flow Route | State of Valve Means 340 | | |
|---|---|---|---|---|
| | | Below T1 | At or above T1 below T2 | At or above T2 |
| | | COOLING MODE 1 | COOLING MODE 2 | COOLING MODE 3 |
| ZERO | Auxiliary conduit 233C | NO | NO | NO |
| | Bypass conduit 228 | NO | NO | NO |
| | Radiator conduit 226C | NO | NO | NO |
| | Engine Block 220B | NO | NO | NO |
| | Engine Head 220HL/220HU | NO | NO | NO |
| | | COOLING MODE 4 | COOLING MODE 5 | COOLING MODE 6 |
| LOW | Auxiliary conduit 233C | YES | YES | YES |
| | Bypass conduit 128 | NO | NO | NO |
| | Radiator conduit 126C | NO | NO | YES |
| | Engine Block 220B | NO | YES | YES |
| | Engine Head 220HL/220HU | YES | YES | YES |
| | | COOLING MODE 7 | COOLING MODE 8 | COOLING MODE 9 |
| MEDIUM | Auxiliary conduit 233C | YES | YES | YES |
| | Bypass conduit 128 | YES | YES | YES |
| | Radiator conduit 126C | NO | NO | YES |
| | Engine Block 220B | YES | YES | YES |
| | Engine Head 220HL/220HU | YES | YES | YES |
| | | COOLING MODE 10 | COOLING MODE 11 | COOLING MODE 12 |
| HIGH | Auxiliary conduit 233C | YES | YES | YES |
| | Bypass conduit 128 | YES | YES | YES |
| | Radiator conduit 126C | YES | YES | YES |
| | Engine Block 220B | YES | YES | YES |
| | Engine Head 220HL/220HU | YES | YES | YES |

Whereas the cooling modes have been described as discrete modes defined by set pump operating states, it will be recognised that in performing the method of control of the present disclosure the cooling system 101, 201 may transition smoothly between one cooling mode and another.

It can be appreciated that various changes may be made within the scope of the present invention, for example, in other embodiments of the invention it is envisaged that the number of pump operating states comprises more or less than four operating states. More specifically, but nevertheless optionally, the pump may have five operating states such that a further series of cooling modes is provided in addition to the series of cooling modes described above. The further series of cooling modes may be defined by a pump operating state that is higher than the MEDIUM state and less than the HIGH state to offer an additional intermediate level of cooling above a normal cooling rate offered when the pump is operating at the MEDIUM state but below the extreme cooling provided when the pump is in the HIGH state. In such an arrangement five cooling maps may be provided to aid the control unit in its selection of a cooling mode from fifteen discrete cooling modes. As such, it is also envisaged that the number of cooling modes comprises more or less than twelve selectable cooling modes. Indeed, as the pump is provided with an increasing number of operating states moving towards almost continuous operation, the number of cooling modes could also be increased. Disadvantageously however, having too many selectable cooling modes may increase the processing resource required to make the selection of cooling mode from the high number of cooling modes and for little benefit since adjacent cooling modes may then offer very similar operational and temperature conditions.

In some envisaged embodiments, it is envisaged that the control unit is configured to default to a specific cooling mode when the engine is first started. Additionally or alternatively, the control unit is configured to monitor the engine and/or one or more auxiliary components of the vehicle before selecting a cooling mode when the engine is first started. Alternatively, the control unit is configured to select the cooling mode that offers maximum cooling when the engine is immediately started and quickly changes the selected cooling mode in dependence upon monitoring of the engine and/or one or more auxiliary components. In some arrangements, the last cooling mode and/or last operating state of the pump may be stored in a memory associated with the control unit and the control unit selects that cooling mode or a cooling mode having the same pump operating state when the engine is first started.

The one or more auxiliary components may comprise a range of additional components. It is envisaged that the cooling system of the present disclosure may be applied to a hybrid vehicle or to a fully electric vehicle and that the engine may comprise a battery and the cooling system may be coupled to the battery.

In embodiments where a valve means or IVM is actively heated to cause the valve to open at a lower coolant temperature, the actual coolant temperature is preferably monitored by the control unit 40, 140. This monitoring of the coolant temperature may be done by using any one or a combination of temperature sensors (for example sensors 12c, 12b, 112c, 112b) and the control unit 40, 140 may be configured to cease controlling the heating element to force the valve means or IVM to open the radiator conduit 126C, 226C when the coolant temperature reaches or exceeds T2 such that the valve means or IVM would remain open. Alternatively, the control unit 40, 140 may, in other envisaged embodiments be configured and arranged to continue heating of the valve means or IVM as appropriately required to force the valve means or IVM to open the radiator conduit 126C, 226C irrespective of the coolant temperature or until selection of a different cooling mode is determined by the control unit 40, 140 in dependence upon the continued monitoring (for example of the cooling system 101, 201, of the engine 120, 220, of the vehicle, of the environment and of auxiliary components 133, 137, 135, 233, 239, 235, 237) being carried out by the control unit 40, 140.

Aspects and embodiments of the invention may be further understood by reference to the following numbered paragraphs:

1. A method of controlling temperature of an engine of a vehicle and/or of one or more auxiliary components of the vehicle, the method comprising:
    (i) monitoring one or more parameters of the engine including the temperature of the engine;
    (ii) monitoring requirements of the one or more auxiliary components of the vehicle and/or monitoring one or more parameters of the one or more auxiliary components of the vehicle; and
    (iii) in dependence upon said monitoring, selecting a cooling mode for a cooling system disposed about said engine and said one or more auxiliary components.
2. A method according to paragraph 1 wherein said selecting a cooling mode is carried out at least in part by a controller and wherein each of a plurality of cooling modes is defined by:
    a. a flow rate at which coolant is output by a pump of the cooling system; and
    b. the route(s) about the cooling system open to the flow of coolant, which route(s) is determined in dependence upon whether one or more valve means comprised within the cooling system is closed or open.
3. A method according to paragraph 2 wherein said monitoring one or more parameters of the engine including the temperature of the engine, further comprises monitoring any one or a combination of: the speed of the engine, the torque of the engine, the environmental temperature and more than one engine temperature obtained at different locations about the engine.
4. A method according to paragraph 3 wherein the one or more auxiliary components is selected from the group comprising: a radiator, a cabin heater, an LP EGR system, an LP EGR cooler, an LP EGR valve, a HP EGR system, a HP EGR cooler, a HP EGR valve, a transmission system, a transmission oil cooler, a turbo, a hybrid system and an air conditioning system.
5. A method according to paragraph 4 wherein said monitoring the requirements of the one or more auxiliary components of the vehicle and/or wherein said monitoring the one or more parameters of the one or more auxiliary components of the vehicle comprises monitoring selected from the group comprising:
    (i) monitoring a transmission system of the engine vehicle;
    (ii) monitoring the temperature of transmission oil contained within a Transmission Oil Cooler (TOC) of the transmission system;
    (iii) monitoring a vehicle cabin heater;
    (iv) monitoring a requirement for heating or cooling of the vehicle cabin;
    (v) monitoring a Low Pressure Exhaust Gas Regeneration (LP EGR) cooler and/or valve;
    (vi) monitoring an LP EGR flow rate;
    (vii) monitoring an exhaust gas temperature;
    (viii) monitoring an LP EGR coolant temperature;
    (ix) monitoring a High Pressure Exhaust Gas Regeneration (HP EGR) cooler and/or valve;
    (x) monitoring an HP EGR flow rate; and
    (xi) monitoring an HP EGR coolant temperature;
    (xii) monitoring a hybrid system including one or more components thereof; and
    (xiii) monitoring an air conditioning system.
6. A method according to paragraph 2 wherein the method additionally comprises selecting the cooling mode such that a minimum flow rate at which coolant is output by the pump of the cooling system is selected in consideration of: an actual and a desired temperature of the engine; and/or an actual and a desired temperature of one or more of the one or more auxiliary components; and/or the current requirements of one or more of the one or more auxiliary components.
7. A method according to paragraph 2 wherein, by controlling the flow rate at which coolant is output by the pump, the controller is configured and arranged to select the required cooling mode, and wherein the method further comprises the controller issuing a command signal to the pump, to a drive mechanism for the pump, or to a retarding mechanism disposed about the pump, to control the flow rate at which coolant is output by the pump.
8. A method according to paragraph 7 wherein controlling the flow rate at which coolant is output by the pump comprises controlling the position of a sleeve or shroud disposed over blades or paddles of the pump and said command signal is issued to an actuator for said sleeve or shroud, wherein the position of the sleeve or shroud is sufficiently adjustable such that the flow rate of the coolant output by the pump is controllable between a zero flow rate and a maximum flow rate and wherein the position of the sleeve or shroud is adjustable in a step-wise manner or in a continuous manner.
9. A method according to paragraph 2 wherein, said controller is configured and arranged to actively or passively control said one or more valves to open or to close one or more fluid conduits comprised within the cooling system, thereby controlling the route(s) available for the flow of coolant about the cooling system and thereby activating the selected cooling mode.
10. A method according to paragraph 9 wherein controlling said one or more valves to open or to close one or more of said one or more fluid conduits comprises controlling the flow rate of the coolant to increase or decrease a pressure differential of the coolant across one of said one or more valves above or below a threshold pressure differential thereby to cause said one of the one or more valves to open or to close one or more of said one or more fluid conduits.
11. A method according to paragraph 10 wherein controlling one of said one or more valves to open or to close one or more of said one or more fluid conduits comprises actively adjusting the temperature within said one of the one or more valves above or below a threshold temperature thereby to cause said one valve to open or to close one or more of said one or more fluid conduits.
12. A method according to paragraph 11 wherein controlling one of said one or more valves to open or to close one or more of said one or more fluid conduits comprises passively allowing the temperature of the coolant to automatically cause said valve to open or to close one or more of said one or more fluid conduits.
13. A method according to paragraph 2 wherein selecting the cooling mode comprises selecting from:
    (i) a first series of cooling modes wherein the flow rate of the coolant output by the pump is zero;
    (ii) a second series of cooling modes wherein the flow rate of the coolant output by the pump is above zero and equal to or less than a low flow rate;
    (iii) a third series of cooling modes wherein the flow rate of the coolant output by the pump is greater than said low flow rate and is below a maximum flow rate;
    (iv) a fourth series of cooling modes wherein the flow rate of the coolant output by the pump is greater than the flow rate of the third series and less than the maximum flow rate; and
    (v) a fifth series of cooling modes wherein the flow rate of the coolant output by the pump is the maximum flow rate.
14. A method according to paragraph 13 wherein the engine is an internal combustion engine comprising a cylinder head having an upper cylinder head and a lower cylinder head and a cylinder block, and the cooling system comprises:
    (i) a first head conduit from the pump through said upper and lower cylinder heads and to a first valve;
    (ii) a second block conduit from the pump, through the cylinder block and to said first valve;
    (iii) a third radiator conduit from said first valve, through a radiator and to the pump;
    (iv) a fourth bypass conduit from said first valve to a second valve, through a bypass conduit and to said pump; and
    (v) a fifth auxiliary conduit from said first valve through at least one auxiliary component and to said pump.
15. A method according to paragraph 16, where, in the first series of cooling modes, the first and second valves are closed and coolant does not flow in the first head conduit, the second block conduit, the third radiator conduit, the fourth bypass conduit or the fifth auxiliary conduit.
16. A method according to paragraph 16, where, in dependence upon the temperature within said first valve or of the coolant being below a first threshold temperature, in a first cooling mode of the second series of cooling modes, coolant does not flow in the second block conduit, the third radiator conduit and the fourth bypass conduit, and coolant does flow in the first head conduit and the fifth auxiliary conduit and where, in dependence upon the temperature within said first valve mean or of the coolant being above a first threshold temperature, in a second cooling mode of the second series of cooling modes, coolant does not flow in the third radiator conduit and the fourth bypass conduit and coolant does flow in the first head conduit, the second block conduit and the fifth auxiliary conduit.
17. A method according to paragraph 16, where, in dependence upon the temperature within said first valve or of the coolant being below a first threshold temperature, in a first cooling mode of the third series of cooling modes, coolant does not flow in the third radiator conduit and coolant does flow in the first head conduit, the second block conduit, the fourth bypass conduit and the fifth auxiliary conduit; and
    where, in dependence upon the temperature within said first valve or of the coolant being above a first threshold temperature, in a second cooling mode of the third series of cooling modes, coolant does not flow in the third radiator conduit and coolant does flow in the first head conduit, the second block conduit, the fourth bypass conduit and the fifth auxiliary conduit; and
    where, in dependence upon the temperature within said first valve or of the coolant being above a second threshold temperature, in a third cooling mode of the third series of cooling modes, coolant does flow in the third radiator conduit and coolant does flow in the first head conduit, the second block conduit, the fourth bypass conduit and the fifth auxiliary conduit;
18. A method according to paragraph 16, where, in the fifth series of cooling modes, coolant does flow in the first head conduit, the second block conduit, the third radiator conduit, the fourth bypass conduit and the fifth auxiliary conduit.
19. A vehicle comprising an engine and a cooling system, the cooling system comprising an adjustable pump, one or more valves, one or more conduits coupled to the engine and to one or more auxiliary components, and a control unit, the control unit being coupled to the adjustable pump and to said one or more valves and the control unit being structured and arranged to carry out the method according to paragraph 1.
20. A program for a control unit of a cooling system, the program being configured and arranged such that when running, the control unit is capable of carrying out the method of paragraph 1.

The invention claimed is:
1. A method of controlling a temperature of an engine of a vehicle and/or of one or more auxiliary components of the vehicle, the method comprising:
    (i) monitoring one or more parameters of the engine including the temperature of the engine;
    (ii) monitoring requirements of the one or more auxiliary components of the vehicle and/or monitoring one or more parameters of the one or more auxiliary components of the vehicle; and
    (iii) in dependence upon said monitoring, selecting a cooling mode for a cooling system disposed about said engine and said one or more auxiliary components,
    wherein said selecting a cooling mode is carried out at least in part by a control means and wherein each of a plurality of cooling modes is defined by:
        (i) a flow rate at which coolant is output by a pump of the cooling system; and
        (ii) the route(s) about the cooling system open to the flow of coolant, which
        route(s) is determined in dependence upon whether one of more valve means comprised within the cooling system is closed or open, and
    wherein said control means is configured and arranged to actively and passively control said one or more valve means to open or to close one or more fluid conduits comprised within the cooling system, thereby control- ling the route(s) available for the flow of coolant about the cooling system and thereby activating the selected cooling mode.

2. A method according to claim 1, wherein said monitoring one or more parameters of the engine including the temperature of the engine, further comprises monitoring any one or a combination of: the speed of the engine, the torque of the engine, the environmental temperature and more than one engine temperature obtained at different locations about the engine.

3. A method according to claim 1 wherein the one or more auxiliary components comprises any one or more of: a radiator, a cabin heater, an LP EGR system, an LP EGR cooler, an LP EGR valve, a HP EGR system, a HP EGR cooler, a HP EGR valve, a transmission system, a transmission oil cooler, a turbo, an air conditioning system and a hybrid system.

4. A method according to claim 3 wherein said monitoring the requirements of the one or more auxiliary components of the vehicle and/or wherein said monitoring the one or more parameters of the one or more auxiliary components of the vehicle comprises any one or a combination of:
(i) monitoring a transmission system of the engine vehicle;
(ii) monitoring the temperature of transmission oil contained within a Transmission Oil Cooler (TOC) of the transmission system;
(iii) monitoring a vehicle cabin heater;
(iv) monitoring a requirement for heating or cooling of the vehicle cabin;
(v) monitoring a Low Pressure Exhaust Gas Regeneration (LP EGR) cooler and/or valve;
(vi) monitoring an LP EGR flow rate;
(vii) monitoring an exhaust gas temperature;
(viii) monitoring an LP EGR coolant temperature;
(ix) monitoring a High Pressure Exhaust Gas Regeneration (HP EGR) cooler and/or valve;
(x) monitoring an HP EGR flow rate; and
(xi) monitoring an HP EGR coolant temperature;
(xii) monitoring a hybrid system including one or more components thereof; and
(xiii) monitoring an air conditioning system.

5. A method according to claim 1 wherein the method additionally comprises selecting the cooling mode such that a minimum flow rate at which coolant is output by the pump of the cooling system is selected in consideration of: an actual and a desired temperature of the engine; and/or an actual and a desired temperature of one or more of the one or more auxiliary components; and/or the current requirements of one or more of the one or more auxiliary components.

6. A method according to claim 1 wherein, by controlling the flow rate at which coolant is output by the pump, the control means is configured and arranged to select the required cooling mode, and wherein the method further comprises the control means issuing a command signal to the pump, to a drive mechanism for the pump, or to a retarding mechanism disposed about the pump, to control the flow rate at which coolant is output by the pump.

7. A method according to claim 6 wherein controlling the flow rate at which coolant is output by the pump comprises controlling the position of a sleeve or shroud disposed over blades or paddles of the pump and said command signal is issued to an actuator for said sleeve or shroud.

8. A method according to claim 7 wherein the position of the sleeve or shroud is sufficiently adjustable such that the flow rate of the coolant output by the pump is controllable between a zero flow rate and a maximum flow rate.

9. A method according to claim 8 wherein the position of the sleeve or shroud is adjustable in a step-wise manner or in a continuous manner.

10. A method according to claim 1 wherein controlling said one or more valve means to open or to close one or more of said one or more fluid conduits comprises controlling the flow rate of the coolant to increase or decrease a pressure differential of the coolant across one of said one or more valve means above or below a threshold pressure differential thereby to cause said one of the one or more valve means to open or to close one or more of said one or more fluid conduits.

11. A method according to claim 1 wherein controlling one of said one or more valve means to open or to close one or more of said one or more fluid conduits comprises actively adjusting the temperature within said one of the one or more valve means above or below a threshold temperature thereby to cause said valve means to open or to close one or more of said one or more fluid conduits.

12. A method according to claim 1 wherein controlling one of said one or more valve means to open or to close one or more of said one or more fluid conduits comprises passively allowing the temperature of the coolant to automatically cause said valve means to open or to close one or more of said one or more fluid conduits.

13. A method according to claim 12 wherein the engine is an internal combustion engine comprising a cylinder head having an upper cylinder head and a lower cylinder head and a cylinder block, and the cooling system comprises:
(i) a first head conduit from the pump through said upper and lower cylinder heads and to a first valve means;
(ii) a second block conduit from the pump, through the cylinder block and to said first valve means;
(iii) a third radiator conduit from said first valve means, through a radiator and to the pump;
(iv) a fourth bypass conduit from said first valve means to a second valve means, through a bypass conduit and to said pump; and
(v) a fifth auxiliary conduit from said first valve means through at least one auxiliary component and to said pump.

14. A method according to claim 13, wherein the first series of cooling modes, the first and second valve means are closed and coolant does not flow in the first head conduit, the second block conduit, the third radiator conduit, the fourth bypass conduit or the fifth auxiliary conduit.

15. A method according to claim 13, wherein depending upon the temperature within said first and/or second valve means or of the coolant being below a first threshold temperature, in a first cooling mode of the second series of cooling modes, coolant does not flow in the second block conduit, the third radiator conduit and the fourth bypass conduit, and coolant does flow in the first head conduit and the fifth auxiliary conduit.

16. A method according to claim 13, wherein depending upon the temperature within said first and/or second valve means or of the coolant being above a first threshold temperature, in a second cooling mode of the second series of cooling modes, coolant does not flow in the third radiator conduit and the fourth bypass conduit and coolant does flow in the first head conduit, the second block conduit and the fifth auxiliary conduit.

17. A method according to claim 13, wherein depending upon the temperature within said first and/or second valve means or of the coolant being below a first threshold temperature, in a first cooling mode of the third series of cooling modes, coolant does not flow in the third radiator conduit and coolant does flow in the first head conduit, the second block conduit, the fourth bypass conduit and the fifth auxiliary conduit.

18. A method according to claim 1 wherein selecting the cooling mode comprises selecting from:
   (i) a first series of cooling modes wherein the flow rate of the coolant output by the pump is zero;
   (ii) a second series of cooling modes wherein the flow rate of the coolant output by the pump is above zero and equal to or less than a low flow rate;
   (iii) a third series of cooling modes wherein the flow rate of the coolant output by the pump is greater than said low flow rate and is below a maximum flow rate; and
   (iv) a fourth series of cooling modes wherein the flow rate of the coolant output by the pump is a maximum flow rate.

* * * * *